US012763903B2

(12) United States Patent
Sen et al.

(10) Patent No.: US 12,763,903 B2
(45) Date of Patent: Oct. 13, 2026

(54) TIMELINE-BASED TRANSMISSION OF SOUNDING REFERENCE SIGNAL (SRS) RESOURCES

(71) Applicant: QUALCOMM Incorporated, San Diego, CA (US)

(72) Inventors: Pinar Sen, San Diego, CA (US); Muhammad Sayed Khairy Abdelghaffar, San Jose, CA (US); Runxin Wang, San Diego, CA (US); Yu Zhang, San Diego, CA (US); Alexandros Manolakos, Escondido, CA (US)

(73) Assignee: QUALCOMM Incorproated, San Diego, CA (US)

( * ) Notice: Subject to any disclaimer, the term of this patent is extended or adjusted under 35 U.S.C. 154(b) by 431 days.

(21) Appl. No.: 18/245,027

(22) PCT Filed: Nov. 11, 2020

(86) PCT No.: PCT/CN2020/128028
§ 371 (c)(1),
(2) Date: Mar. 13, 2023

(87) PCT Pub. No.: WO2022/099494
PCT Pub. Date: May 19, 2022

(65) Prior Publication Data
US 2023/0403117 A1 Dec. 14, 2023

(51) Int. Cl.
*H04L 5/00* (2006.01)

(52) U.S. Cl.
CPC .......... *H04L 5/0051* (2013.01); *H04L 5/0091* (2013.01)

(58) Field of Classification Search
CPC ... H04L 5/0048; H04L 5/0051; H04L 5/0053; H04L 5/0091; Y02D 30/70
See application file for complete search history.

(56) References Cited

U.S. PATENT DOCUMENTS

2018/0287682 A1 10/2018 Kwak et al.
2019/0280835 A1 9/2019 Määttänen et al.
(Continued)

FOREIGN PATENT DOCUMENTS

CN 109923828 A 6/2019
CN 110855411 A 2/2020
(Continued)

OTHER PUBLICATIONS

NTT Docomo Inc: "Remaining Issues on Multi-beam Operation", R1-2002449, 3rd Generation Partnership Project, Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 10, 2020, 7 pages, XP051873566, Section 2.3.
(Continued)

*Primary Examiner* — Mansour Oveissi
(74) *Attorney, Agent, or Firm* — Harrity & Harrity, LLP

(57) ABSTRACT

Various aspects of the present disclosure generally relate to wireless communication. In some aspects, a mobile station may receive a medium access control (MAC) control element (MAC CE) indicating a MAC CE configuration associated with a sounding reference signal (SRS) resource. The mobile station may receive downlink control information (DCI) indicating a DCI configuration associated with the SRS resource. The mobile station may selectively transmit SRS information associated with the SRS resource based at least in part on a time of receipt of the MAC CE. Numerous other aspects are provided.

44 Claims, 9 Drawing Sheets

(56) References Cited

U.S. PATENT DOCUMENTS

| | | | | |
|---|---|---|---|---|
| 2019/0281588 | A1 | 9/2019 | Zhang et al. | |
| 2019/0372727 | A1 | 12/2019 | Joseph et al. | |
| 2020/0059338 | A1 | 2/2020 | Joseph et al. | |
| 2020/0280404 | A1* | 9/2020 | Qin | H04L 5/0048 |
| 2020/0351794 | A1 | 11/2020 | Xu et al. | |
| 2022/0224470 | A1* | 7/2022 | Matsumura | H04B 7/0404 |
| 2023/0269043 | A1* | 8/2023 | Matsumura | H04L 5/0053 370/329 |

FOREIGN PATENT DOCUMENTS

| | | | |
|---|---|---|---|
| WO | 2019191954 | A1 | 10/2019 |
| WO | 2019214460 | A1 | 11/2019 |

OTHER PUBLICATIONS

Supplementary European Search Report—EP20961053—Search Authority—The Hague—Jun. 26, 2024.

International Search Report and Written Opinion - PCT/CN2020/128028 - ISA/EPO - 2021-08-10 (2100745WO1).

Qualcomm Incorporated: "Discussion on SRS Enhancement", 3GPP Tsg-Ran WG1 Meeting #103-e, R1-2009255, 3rd Generation Partnership Project, Mobile Competence Centre, 650, Route Des Lucioles, F-06921 Sophia-Antipolis Cedex, France, vol. Ran WG1, No. e-Meeting, 20201026 - 20201113, Oct. 24, 2020, XP051946918, 32 Pages.

NTT Docomo Inc: "Remaining Issues on Multi-beam Operation", 3GPP TSG RAN WG1 #100bis e-Meeting, Apr. 20-30, 2020, R1-2002449, Apr. 10, 2020, XP051873566, pp. 1-7.

* cited by examiner

TIMELINE-BASED TRANSMISSION OF SOUNDING REFERENCE SIGNAL (SRS) RESOURCES

CROSS-REFERENCE TO RELATED APPLICATION

This application is a 371 national stage of Patent Cooperation Treaty (PCT) Application No. PCT/CN2020/128028 filed on Nov. 11, 2020, entitled "TIMELINE-BASED TRANSMISSION OF SOUNDING REFERENCE SIGNAL (SRS) RESOURCES," which is hereby expressly incorporated by reference herein.

FIELD OF THE DISCLOSURE

Aspects of the present disclosure generally relate to wireless communication and to techniques and apparatuses for timeline-based transmission of sounding reference signal (SRS) resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BS s) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes receiving, by the mobile station, a medium access control (MAC) control element (MAC CE) indicating a MAC CE configuration associated with a sounding reference signal (SRS) resource; receiving, by the mobile station, downlink control information (DCI) indicating a DCI configuration associated with the SRS resource; and selectively transmitting, by the mobile station, SRS information associated with the SRS resource based at least in part on a time of receipt of the MAC CE.

In some aspects, a mobile station for wireless communication includes a memory; and one or more processors operatively coupled to the memory, the memory and the one or more processors configured to: receive a MAC CE indicating a MAC CE configuration associated with an SRS resource; receive DCI indicating a DCI configuration associated with the SRS resource; and selectively transmit SRS information associated with the SRS resource based at least in part on a time of receipt of the MAC CE.

In some aspects, a non-transitory computer-readable medium storing a set of instructions for wireless communication includes one or more instructions that, when executed by one or more processors of a mobile station, cause the mobile station to: receive a MAC CE indicating a MAC CE configuration associated with an SRS resource; receive DCI indicating a DCI configuration associated with the SRS resource; and selectively transmit SRS information associated with the SRS resource based at least in part on a time of receipt of the MAC CE.

In some aspects, an apparatus for wireless communication includes means for receiving a MAC CE indicating a MAC CE configuration associated with an SRS resource; means for receiving DCI indicating a DCI configuration associated with the SRS resource; and means for selectively transmitting SRS information associated with the SRS resource based at least in part on a time of receipt of the MAC CE.

Aspects generally include a method, apparatus, system, computer program product, non-transitory computer-readable medium, user equipment, base station, mobile station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
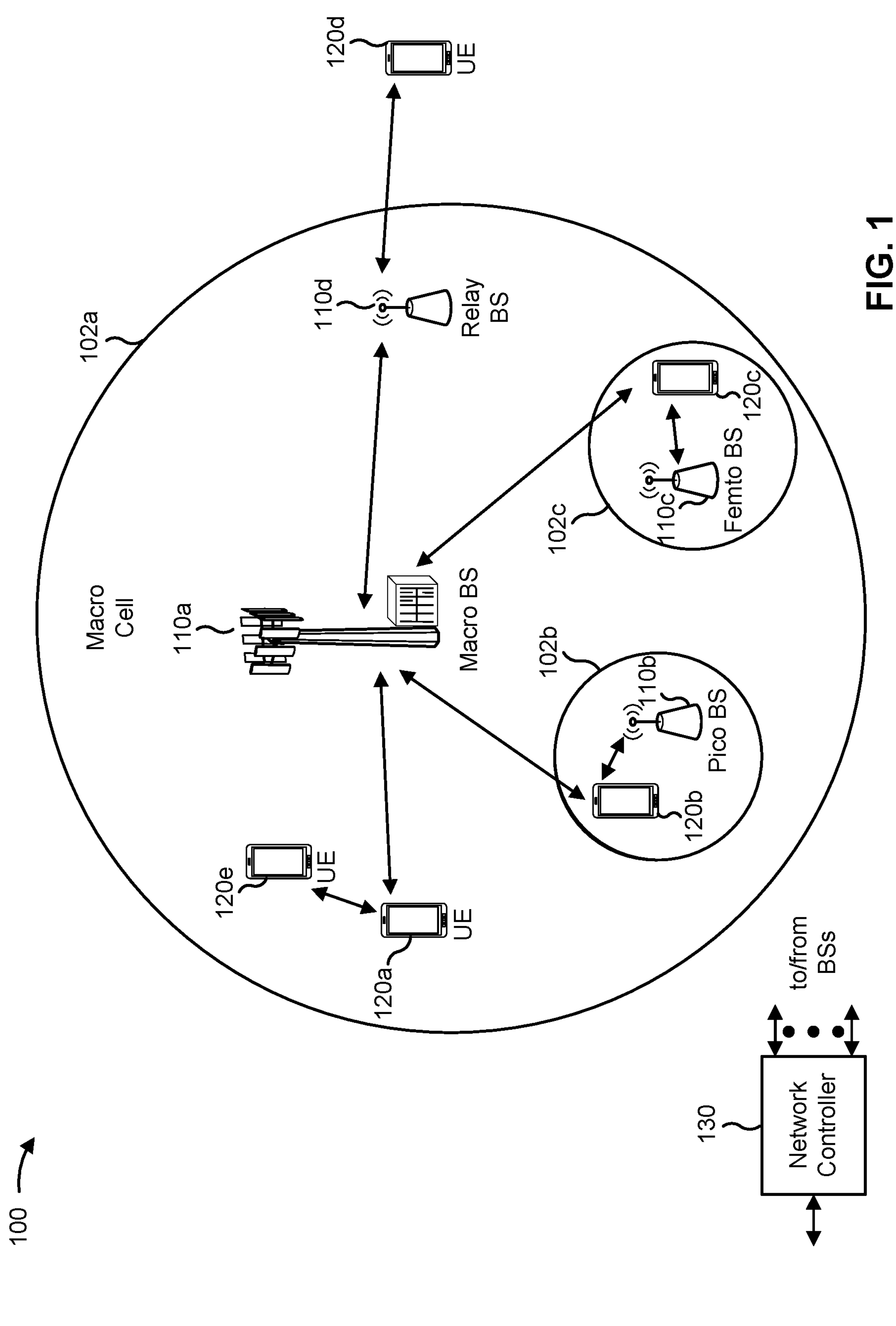
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a “sub-6 GHz” band. Similarly, FR2 is often referred to as a “millimeter wave” band despite being different from the extremely high frequency (EHF) band (30 GHz-300 GHz) which is identified by the International Telecommunications Union (ITU) as a “millimeter wave” band. Thus, unless specifically stated otherwise, it should be understood that the term “sub-6 GHz” or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term “millimeter wave” or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
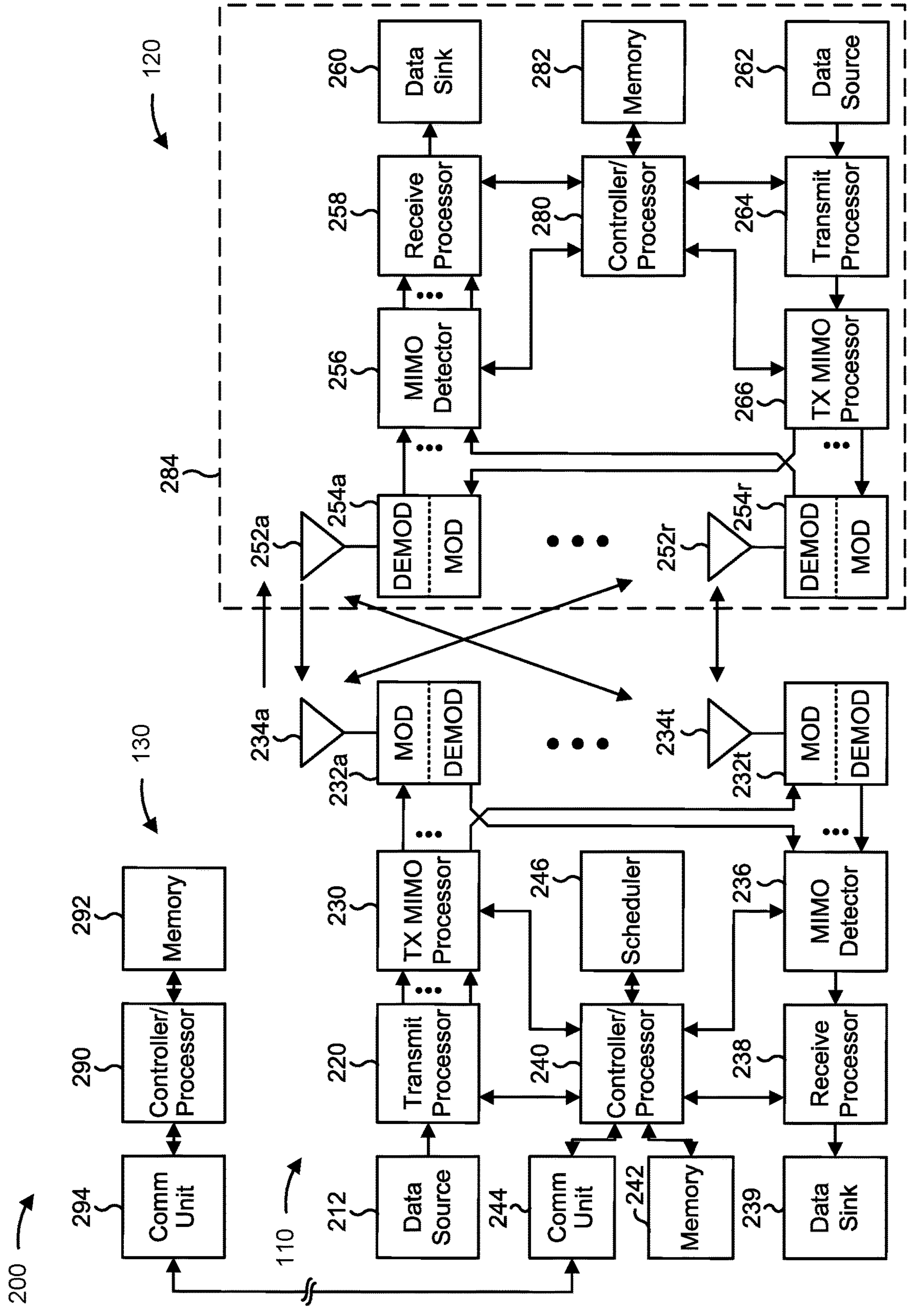
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-9.

Controller/processor 240 of base station 110, controller/processor 280 of UE 120, and/or any other component(s) of FIG. 2 may perform one or more techniques associated with timeline-based transmission of SRS resources, as described in more detail elsewhere herein. In some aspects, a mobile station described herein may be the UE 120, may be included in the UE 120, or may include one or more components of the UE 120 shown in FIG. 2. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, a mobile station includes means for receiving a MAC CE indicating a MAC CE configuration associated with an SRS resource; means for receiving DCI indicating a DCI configuration associated with the SRS resource; or means for selectively transmitting SRS information associated with the SRS resource based at least in part on a time of receipt of the MAC CE. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for determining that a time interval between the time of receipt of the MAC CE and a time of transmitting of the SRS information fails to satisfy a threshold time interval, wherein selectively transmitting the SRS information comprises transmitting the SRS information according to the DCI configuration based at least in part on the time interval failing to satisfy the threshold time interval.

In some aspects, the mobile station includes means for determining that a time interval between the time of receipt of the MAC CE and a time of transmitting of the SRS information satisfies a threshold time interval, wherein selectively transmitting the SRS information comprises transmitting the SRS information according to the MAC CE configuration and without regard to the DCI configuration based at least in part on the time interval satisfying the threshold time interval.

In some aspects, the mobile station includes means for determining that a time interval between the time of receipt of the MAC CE and a time of transmitting of the SRS information satisfies a threshold time interval, wherein selectively transmitting the SRS information comprises transmitting the SRS information according to the DCI configuration and without regard to the MAC CE configuration based at least in part on the time interval satisfying the threshold time interval.

In some aspects, the mobile station includes means for determining that a time interval between the time of receipt of the MAC CE and a time of transmitting of the SRS information satisfies a threshold time interval, wherein selectively transmitting the SRS information comprises canceling transmitting the SRS information based at least in part on the time interval satisfying the threshold time interval.

In some aspects, the mobile station includes means for storing the MAC CE configuration to be applied to a later selective transmission when the time of receipt of the MAC CE is during a time of transmitting the SRS information.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may conduct data communication with a BS in a wireless network such as an LTE network or a 5G/NR network. The BS and UE may utilize respective transmission and reception circuitry to conduct the data communication. The data communication may include downlink communications from the BS to the UE and may include uplink communications from the UE to the BS.

The downlink communications may include control information received by the UE via, for example, medium access control (MAC) signaling, downlink control information (DCI) signaling, or a combination thereof. The MAC signaling may include a MAC control element (MAC CE) to activate or deactivate sounding reference signal (SRS) resources, utilized by the UE to perform, for example, antenna switching operations, codebook-based operations, non-codebook-based operations, beam management operations, or the like. The DCI signaling may include information to trigger the UE to transmit select SRS resources (e.g., SRS information) to the BS. In one example, the select SRS resources may include a currently (e.g., in real-time) activated SRS resource. Based on receiving the SRS, the BS may estimate a measure of quality associated with an uplink channel utilized by the UE to transmit the SRS information. As used herein "transmitting an SRS resource" is synonymous with "transmitting an SRS on an SRS resource."

In some instances, the DCI, which includes information to trigger the UE to transmit the SRS information, may also include an SRS request indicator (SRI) that reconfigures the SRS resources. For instance, DCI associated with codebook-based operations and/or non-codebook-based operations may include an SRI that activates an SRS resource previously deactivated by the MAC CE and/or deactivates an SRS resource previously activated by the MAC CE. In such instances, the UE may be unable to adequately determine whether a given SRS resource, which is activated by the DCI and was previously deactivated by the MAC CE, is to be considered as a currently activated SRS resource that should be transmitted to the BS. Similarly, the UE may be unable to adequately determine whether a given SRS resource, which is deactivated by the DCI and was previously activated by the MAC CE, is to be considered as a currently activated SRS resource that should be transmitted to the BS. In some cases, this ambiguity may be based at least in part on a delay associated with processing MAC messaging. For example, MAC messaging may be associated with a delay of approximately 3 ms, so it may be unclear how a UE should handle DCI that is received within 3 ms of a MAC CE if the DCI and the MAC CE conflict with each other.

Without being able to adequately determine whether the given SRS resource is to be considered as a currently activated SRS resource that should be transmitted to the BS, the UE may erroneously transmit the given SRS resource when the given SRS resource should not have been considered to be a currently activated SRS resource and/or may erroneously fail to transmit the given SRS resource when the given SRS resource should have been considered to be a currently activated SRS resource. The UE may have to retransmit SRS resources to correct the erroneous failure to transmit the given SRS resource. Erroneous transmissions and corrective retransmissions may result in inefficient utilization of network resources (e.g., bandwidth, subchannels, or the like) and UE resources (e.g., amount of processing, utilization of memory, power consumption, or the like). The above errors may also introduce a delay in the BS receiving error-free SRS information and accurately estimating the measure of quality associated with the uplink channel utilized by the UE. As a result, the data communication between the BS and the UE may experience an interruption or stoppage.

Various aspects of techniques and apparatuses described herein may enable a UE to perform timeline-based transmission of SRS resources. In some aspects, performing the timeline-based transmission of SRS resources, as discussed herein, may include adequately determining whether a given SRS resource is to be considered as a currently activated SRS resource that should be transmitted to the BS. In some aspects, the UE may determine whether a given SRS resource is to be considered as a currently activated SRS resource based at least in part on a time of receipt of a MAC CE. As a result, the UE may avoid erroneous transmissions and corrective retransmissions associated with transmitting the given SRS resource to the BS, thereby enabling efficient utilization of UE resources and network resources. A delay in the BS receiving error-free SRS information and accurately estimating a measure of quality associated with an uplink channel utilized by the UE may also be avoided. In this way, data communication between the UE and the BS may be improved.

In some aspects, the UE may receive a medium access control (MAC) control element (MAC CE) indicating a MAC CE configuration associated with a sounding reference signal (SRS) resource, receive downlink control information (DCI) indicating a DCI configuration associated with the SRS resource, and selectively transmit SRS information associated with the SRS resource based at least in part on a time of receipt of the MAC CE.

Figure 3:
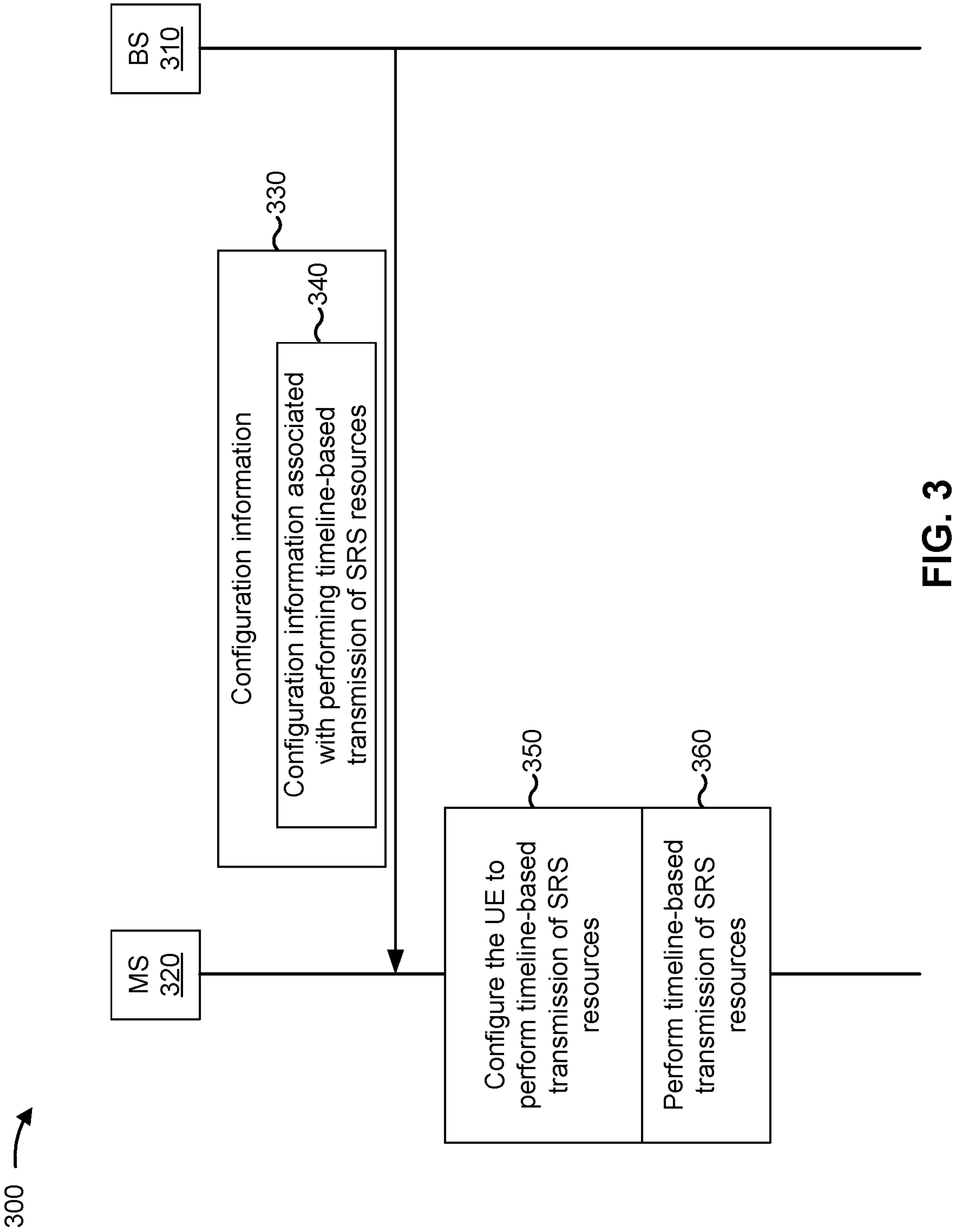
FIG. 3 is a diagram illustrating an example associated with timeline-based transmission of SRS resources, in accordance with various aspects of the present disclosure.

FIGS. 3-7 are diagrams illustrating examples 300, 400, 500, 600, and 700 associated with timeline-based transmission of SRS resources, in accordance with various aspects of the present disclosure. FIG. 3 shows a mobile station (MS) 320 (e.g., UE 120) and a BS 110 conducting data communication in, for example, an LTE network or a 5G/NR network. The data communication may include downlink communications from the BS 310 to the MS 320 and may include uplink communications from the MS 320 to the BS 310.

As shown by reference number 330, the BS 310 may transmit, and the MS 320 may receive, configuration information at a beginning of and/or during the data communication. In some aspects, the MS 320 may receive the configuration information from a device other than BS 310 (e.g., from another base station). In some aspects, the MS 320 may receive the configuration information via, for example, a control channel (e.g., a PDCCH) between the MS 320 and the BS 310. The configuration information may be communicated via radio resource control (RRC) signaling, medium access control (MAC) signaling, downlink control information (DCI) signaling, or a combination thereof (e.g., RRC configuration of a set of values for a parameter and DCI indication of a selected value of the parameter).

In some aspects, the configuration information may include an indication of, for example, one or more configuration parameters for the MS 320 to use to configure the MS 320 for the data communication. For instance, as shown by reference number 340, the configuration information may include information associated with configuring the MS 320 to perform timeline-based transmission of SRS resources. As shown by reference number 350, based at least in part on the configuration information, the MS 320 may configure the MS 320 to perform the timeline-based transmission of SRS resources.

In some aspects, the configuration information may include information to enable the MS 320 to configure the MS 320 with one or more SRS resource sets, each of which comprises a respective one or more SRS resources (e.g., configured SRS resources). The configured SRS resources may be utilized by the MS 320 to perform, for example, SRS signaling antenna switching operations, codebook-based operations, non-codebook-based operations, beam management operations, or the like.

Figure 4:
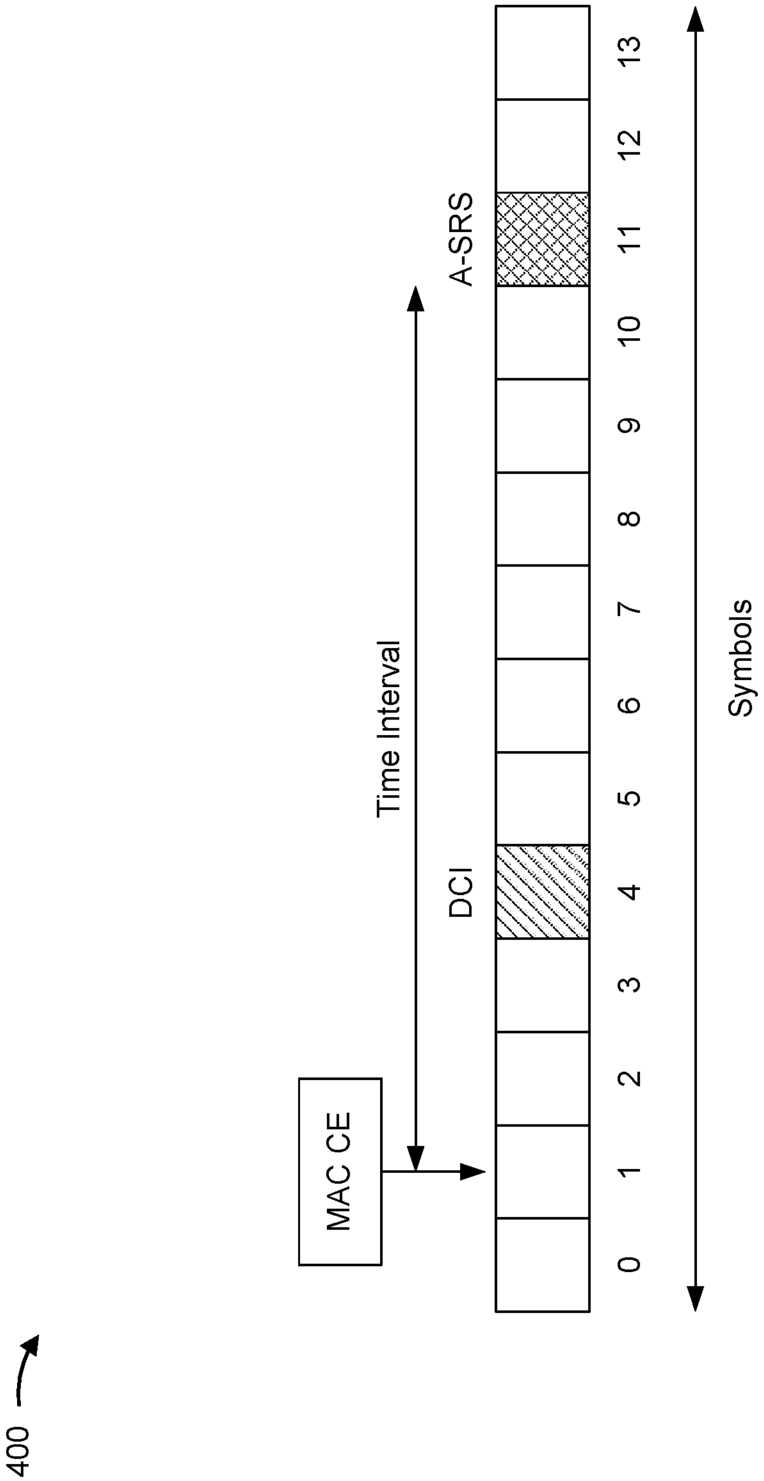
FIG. 4 is a diagram illustrating an example associated with timeline-based transmission of SRS resources, in accordance with various aspects of the present disclosure.

As shown by reference number 360, the MS 320 may perform the timeline-based transmission of SRS resources based at least in part on configuring the MS 320 to perform the timeline-based transmission of SRS resources. For instance, example 400 of FIG. 4 shows symbols (e.g., Symbol 0, Symbol 1, . . . , Symbol 13) arranged in a slot along an x-axis representing time. In some aspects, the symbols may include symbols discussed above with respect to FIG. 2. The MS 320 may receive a MAC CE during a time span associated with Symbol 1 and may subsequently receive a DCI during a time span associated with Symbol 4. The DCI may also include information to trigger the MS 320 to aperiodically transmit select SRS resources (e.g., aperiodic SRS information (A-SRS)), from among the configured SRS resources, to the BS 310. For instance, the DCI may include information to trigger transmission of the A-SRS by the MS 320 during a time span associated with Symbol 11.

In some aspects, the MAC CE may indicate a MAC CE configuration of the configured SRS resources. In some aspects, the MAC CE configuration may include information to activate or deactivate a given SRS resource, from among the configured SRS resources. The subsequently received DCI may include information (e.g., an SRI) that indicates a DCI configuration of the configured SRS resources. In some aspects, the DCI configuration may include information to reconfigure the SRS resources such that the DCI configuration may activate the given SRS resource, previously deactivated by the MAC CE configuration and/or may include information to deactivate the given SRS resource, previously activated by the MAC CE configuration.

For instance, in a situation where the MAC CE configuration deactivates the given SRS resource and the subsequently received DCI configuration activates the given SRS resource, the configuration information may enable the MS 320 to configure the MS 320 to determine whether the given resource is to be considered a currently activated SRS resource that should be transmitted to the BS in the A-SRS. In some aspects, the configuration information may enable the MS 320 to determine whether the given resource is to be considered a currently activated SRS resource based at least in part on a time of receipt of the MAC CE.

For instance, the MS 320 may determine whether a time interval between the time of receipt of the MAC CE and a time of transmitting the A-SRS fails to satisfy a threshold time interval (e.g., a duration of the time interval is smaller than a duration of the threshold time interval). In some aspects, the duration of the threshold time interval may be associated with a duration of time for the MS 320 to process and/or implement the MAC CE configuration (e.g., activation and/or deactivation) to the configured SRS resources. In some aspects, the threshold time interval may be configured by the network via RRC signaling. In some aspects, the duration of the threshold time interval may be, for example, 3 milliseconds.

When the time interval fails to satisfy the threshold time interval, the MS 320 may not have enough time to adequately process and/or implement the MAC CE configuration to the configured SRS resources. For instance, when the time interval fails to satisfy the threshold level, the MS 320 may be unable to determine that the MAC CE configuration has deactivated the given SRS resource. As a result, the MS 320 may determine, based at least in part on the DCI configuration, that the given SRS resource is to be considered a currently activated resource that is to be transmitted to the BS 310 in the A-SRS. In this case, the MS 320 may transmit the given SRS resource in the A-SRS. In other words, the MS 320 may transmit the A-SRS according to the DCI configuration.

When the MS 320 determines that the time interval between the time of receipt of the MAC CE and the time of transmitting the A-SRS satisfies the threshold time interval (e.g., a duration of the time interval is equal to or greater than the duration of the threshold time interval), the MS 320 may have enough time to adequately process and/or implement the MAC CE configuration to the configured SRS resources. For instance, when the time interval satisfies the threshold level, the MS 320 may adequately determine that the MAC CE configuration has deactivated the given SRS resource. As a result, the MS 320 may determine, based at least in part on the MAC CE configuration, that the given SRS resource is to be considered a currently deactivated resource that is not to be transmitted to the BS 310 in the A-SRS. In this case, the MS 320 may not transmit the given SRS resource in the A-SRS. In other words, the MS 320 may disregard activation of the given SRS resource by the subsequently received DCI configuration, and may transmit the A-SRS according to the MAC CE configuration. In some aspects, the MS 320 may disregard activation of the given SRS resource by the subsequently received DCI configuration based at least in part on determining such activation as an error for being inconsistent with deactivation of the given SRS resource by the MAC CE configuration.

Alternatively, when the time interval satisfies the threshold level, the MS 320 may determine, based at least in part on the DCI configuration, that the given SRS resource is to be considered a currently activated resource that is to be transmitted to the BS 310 in the A-SRS. In this case, the MS 320 may transmit the given SRS resource in the A-SRS. In other words, the MS 320 may disregard the deactivation of the given SRS resource by the MAC CE configuration, and may transmit the A-SRS according to the subsequently received DCI configuration. In some aspects, the MS 320 may disregard deactivation of the given SRS resource by the MAC CE configuration based at least in part on determining such deactivation as being a prior configuration that is to be revised according to the subsequently (e.g., more recently) received DCI configuration.

The above description, of the situation where the MAC CE configuration deactivates a given SRS resource and the subsequently received DCI configuration activates the given SRS resource, is provided as an example. The present disclosure contemplates analogous descriptions of situations including where, for example, the MAC CE configuration activates a given SRS resource and the subsequently received DCI configuration deactivates the given SRS resource.

Figure 5A:
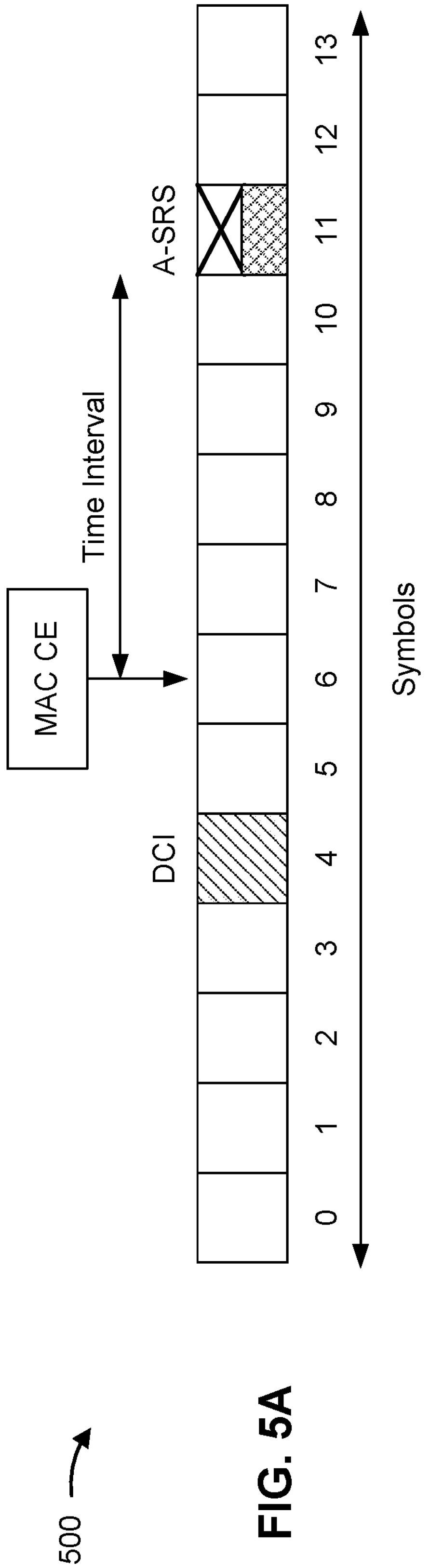
FIGS. 5A-5B are diagrams illustrating examples associated with timeline-based transmission of SRS resources, in accordance with various aspects of the present disclosure.

Similar to FIG. 4, FIG. 5A shows symbols (e.g., Symbol 0, Symbol 1, . . . , Symbol 13) arranged in a slot along an x-axis representing time. In some aspects, as shown in FIG. 5A, the MS 320 may receive the MAC CE after receiving the DCI. For instance, the MS 320 may receive the DCI during a time span associated with Symbol 4 and may subsequently receive the MAC CE during a time span associated with Symbol 6. The DCI may also include information to trigger the MS 320 to aperiodically transmit the A-SRS during a time span associated with Symbol 11.

In this case, the MS 320 may determine that the subsequently received MAC CE configuration has disabled transmission of the A-SRS, which was triggered by the DCI. As a result, when the MS 320 determines that the time interval between the time of receipt of the MAC CE and the time of transmitting the A-SRS satisfies the threshold time interval, the MS 320 may cancel transmission of the A-SRS (shown by X in FIG. 5A) based at least in part on receiving the MAC CE after receiving the DCI and/or based at least in part on the time interval satisfying the threshold time interval.

Alternatively, when the MS 320 determines that the time interval between the time of receipt of the MAC CE and the time of transmitting the A-SRS fails to satisfy the threshold time interval, the MS 320 may not have enough time to adequately process and/or implement the MAC CE configuration. As a result, the MS 320 may transmit the A-SRS according to the DCI configuration. In some aspects, the DCI configuration may be associated with a previous MAC CE configuration based at least in part on a previously received MAC CE. In some aspects, the DCI configuration may be the same as the previous MAC CE configuration when, for example, the DCI configuration is consistent with the previous MAC CE configuration (e.g., the DCI configuration does not deactivate an SRS resource previously activated by the previous MAC CE configuration and/or the DCI configuration does not activate an SRS resource previously deactivated by the previous MAC CE configuration).

Figure 5B:
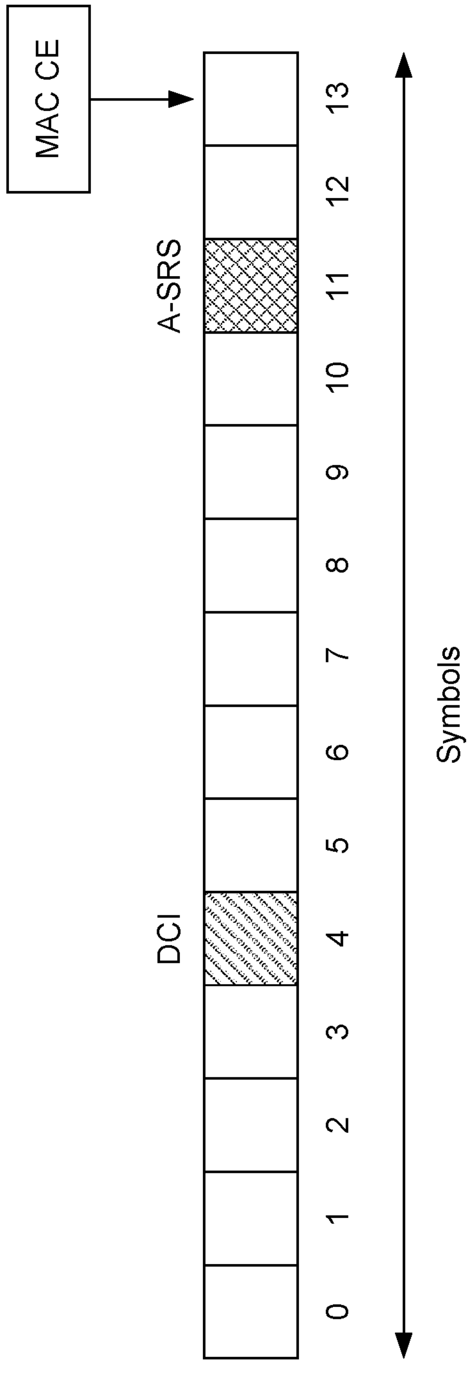

As shown in FIG. 5B, the MS 320 may receive the MAC CE after receiving the DCI and after transmitting the A-SRS. For instance, as shown in FIG. 5B, the MS 320 may receive the DCI during a time span associated with Symbol 4, may transmit the A-SRS (triggered by the DCI) during a time span associated with Symbol 11, and may subsequently receive the MAC CE during a time span associated with Symbol 13.

In this case, the MS 320 may transmit the A-SRS according to the DCI configuration. In some aspects, the DCI configuration may be associated with a previous MAC CE configuration based at least in part on a previously received MAC CE. In some aspects, the DCI configuration may be the same as the previous MAC CE configuration when, for example, the DCI configuration is consistent with the previous MAC CE configuration (e.g., the DCI configuration does not deactivate an SRS resource previously activated by the previous MAC CE configuration and/or the DCI configuration does not activate an SRS resource previously deactivated by the previous MAC CE configuration). In some aspects, the MS 320 may store the MAC CE configuration received during the time span associated with Symbol 13 for processing and/or implementation associated with transmission of another (e.g., future) A-SRS.

Figure 6:
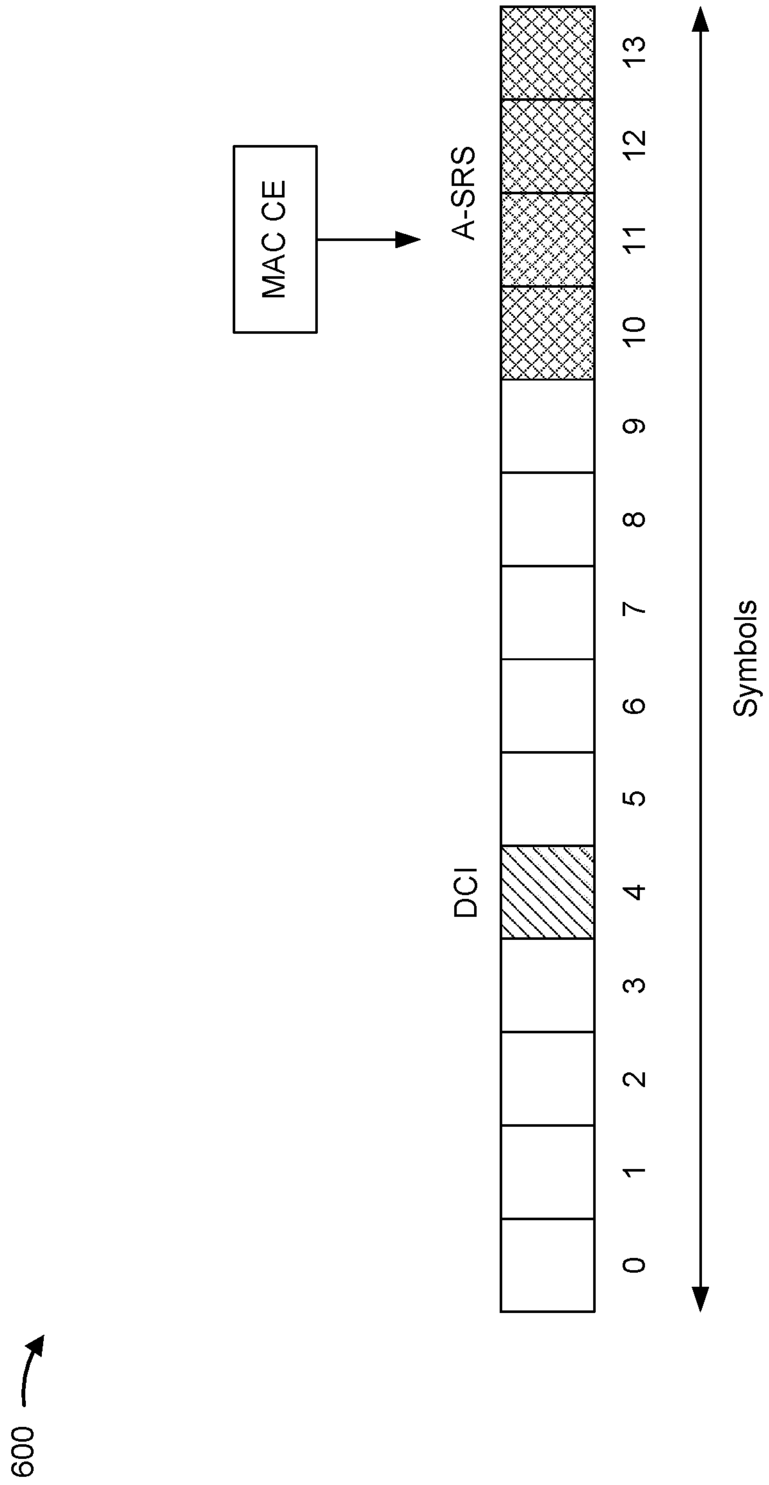
FIG. 6 is a diagram illustrating an example associated with timeline-based transmission of SRS resources, in accordance with various aspects of the present disclosure.

FIG. 6 shows symbols (e.g., Symbol 0, Symbol 1, . . . , Symbol 13) arranged in a slot along an x-axis representing time. In some aspects, as shown in FIG. 6, the MS 320 may receive a MAC CE during transmission of the A-SRS, which may occur over multiple symbols (e.g., Symbols 10-13). For instance, a MS 320 may receive a DCI during a time span associated with Symbol 4, may begin transmitting the A-SRS (triggered by the DCI) during a time span associated with Symbol 10, and may receive the MAC CE during the time span associated with Symbol 11.

In this case, the MS 320 may disregard the MAC CE received during transmission of the A-SRS, and may transmit the A-SRS according to the DCI configuration. In some aspects, the MS 320 may disregard the MAC CE received during transmission of the A-SRS based at least in part on determining such reception of the MAC CE as being an erroneous reception during transmission of the A-SRS. In some aspects, the DCI configuration may be associated with a previous MAC CE configuration based at least in part on a previously received MAC CE. In some aspects, the DCI configuration may be the same as the previous MAC CE configuration when, for example, the DCI configuration is consistent with the previous MAC CE configuration (e.g., the DCI configuration does not deactivate an SRS resource previously activated by the previous MAC CE configuration and/or the DCI configuration does not activate an SRS resource previously deactivated by the previous MAC CE configuration).

Alternatively, instead of disregarding the MAC CE received during transmission of the A-SRS and while continuing to transmit the A-SRS according to the DCI configuration, the MS 320 may store the MAC CE configuration included in the MAC CE received during transmission of the A-SRS for processing and/or implementation associated with transmission of another (e.g., future) A-SRS. For example, the MS 320 may apply the MAC CE configuration for transmission of a future A-SRS.

Figure 7:
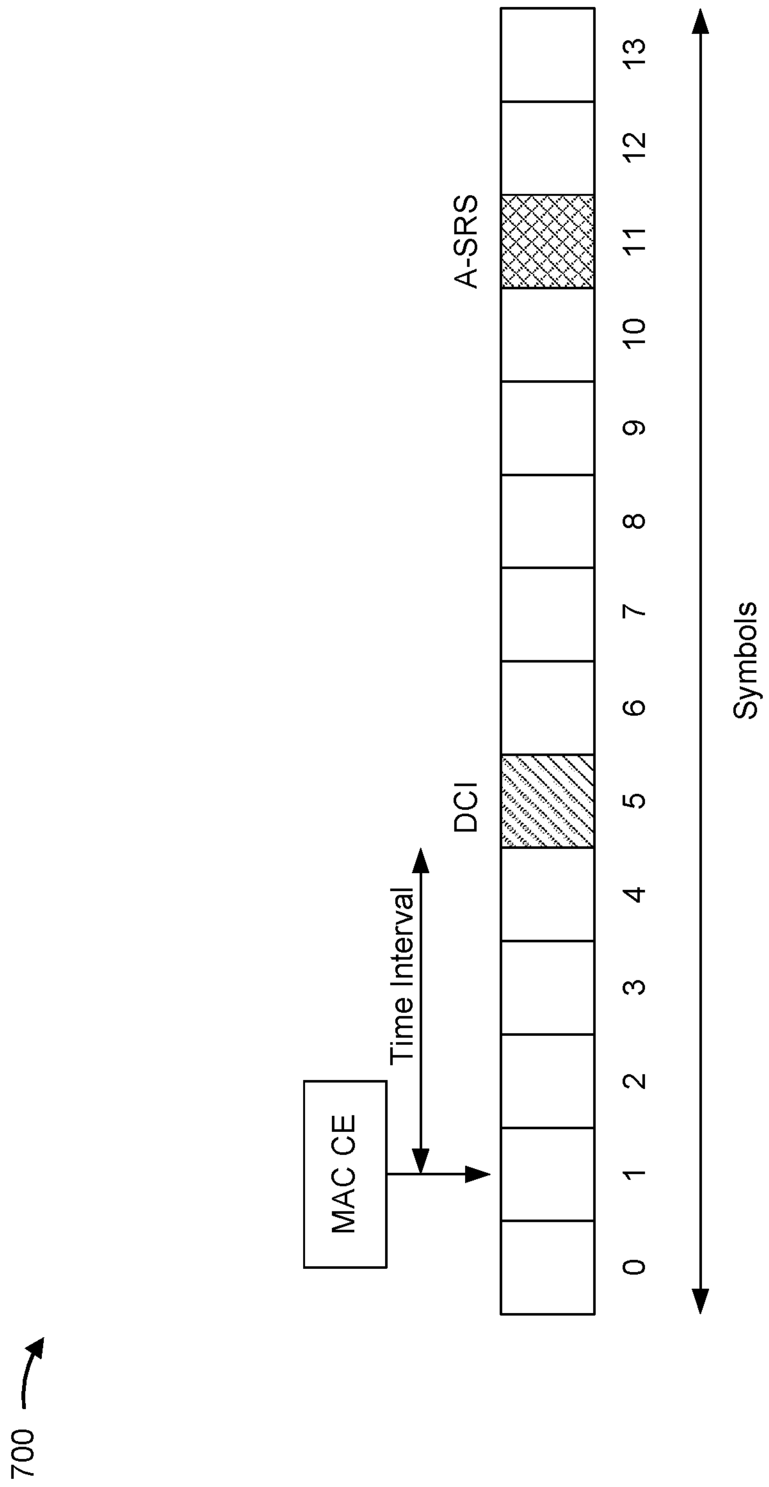
FIG. 7 is a diagram illustrating an example associated with timeline-based transmission of SRS resources, in accordance with various aspects of the present disclosure.

Example 700 of FIG. 7 shows symbols (e.g., Symbol 0, Symbol 1, . . . , Symbol 13) arranged in a slot along an x-axis representing time. A MS 320 may receive a MAC CE during a time span associated with Symbol 1 and may subsequently receive a DCI during a time span associated with Symbol 5. The DCI may also include information to trigger the MS 320 to transmit an A-SRS to the BS 310 during a time span associated with Symbol 11.

In some aspects, the MAC CE may indicate a MAC CE slot offset and the DCI may indicate a DCI slot offset. In some aspects, a slot offset may be associated with transmission of the A-SRS. For instance, the slot offset may indicate a number of symbols that the MS 320 is to wait after receiving the DCI and prior to transmitting the A-SRS. With respect to FIG. 7, the slot offset may indicate that the MS 320 is to wait for a time span associated with Symbols 6-10 after receiving the DCI during the time span associated with Symbol 5 and prior to transmitting the A-SRS during the time span associated with Symbol 11.

In some aspects, the DCI slot offset may be different with respect to the MAC CE slot offset. In this case, the MS 320 may determine whether a time interval between the time of receipt of the MAC CE and a time of receipt of the DCI fails to satisfy a threshold offset interval (e.g., a duration of the time interval is smaller than a duration of the threshold offset interval). In some aspects, the threshold offset interval may be configured by the network via RRC signaling. In some aspects, the duration of the threshold offset interval may be, for example, 3 milliseconds.

When the MS 320 determines that the time interval between the time of receipt of the MAC CE and the time of receipt of the DCI fails to satisfy the threshold offset interval, the MS 320 may not have enough time to process and/or implement the MAC CE slot offset, and may transmit the A-SRS according to the DCI slot offset. In some aspects, the DCI slot offset may be associated with a previous MAC CE slot offset based at least in part on a previously received MAC CE. In some aspects, the DCI slot offset may be the same as the previous MAC CE slot offset when, for example, the DCI slot offset is consistent with the previous MAC CE slot offset (e.g., the DCI slot offset and the previous MAC CE slot offset indicate the same number of symbols that the MS 320 is to wait after receiving the DCI and prior to transmitting the A-SRS). In some aspects, the MS 320 may store the MAC CE slot offset for processing and/or implementation associated with transmission of another (e.g., future) A-SRS. In some aspects, the MS 320 may transmit the A-SRS according to a slot offset previously configured by the network via, for example, RRC signaling.

When the MS 320 determines that the time interval between the time of receipt of the MAC CE and the time of receipt of the DCI satisfies the threshold offset interval (e.g., the duration of the time interval is equal to or greater than the duration of the threshold offset interval), the MS 320 may have enough time to process and/or implement the MAC CE slot offset, and may transmit the A-SRS according to the MAC CE slot offset.

The MS 320 may perform the timeline-based transmission of SRS resources (e.g., A-SRS), as discussed above. In some aspects, the MS 320 may utilize included transmission circuitry to transmit data (e.g., A-SRS or the like) to the BS 310 and may utilize included reception circuitry to receive data (e.g., MAC CE, DCI, or the like) from the BS 310. The transmission circuitry may include, for example, one or more components (e.g., transmit processor 264, TX MIMO processor 266, modulator 254, and/or antennas 252) and the reception circuitry may include, for example, one or more components (e.g., receive processor 258, MIMO detector 256, demodulator 254, and/or antennas 252), as discussed above with respect to FIG. 2.

In some aspects, a given aperiodic SRS resource set (e.g., SRS information) may be transmitted in a (t+1)-th available slot counting from a reference slot, where t may be indicated by the DCI and/or by RRC (if one value of t is configured in RRC), and candidate values of t at least include 0. In some aspects, the reference slot may be the slot in which the DCI is received (e.g., the slot with the triggering DCI). Additionally, or alternatively, the reference slot may be a slot indicated by a legacy triggering offset. In some aspects, an available slot may be determined based at least in part on a processing complexity of the MS 320 and/or a timeline associated with determining the available slot and/or potential co-existence with collision handling, or the like. In some aspects, an available slot may be associated with uplink or flexible symbols for one or more time domain locations for one or more SRS resources in a resource set an satisfies a minimum timing requirement between triggering PDCCH and one or more SRS resources in the resource set.

In some aspects, configuration and/or signaling associated with the available slot may include RRC configuration, DCI signaling, MAC CE signaling or the like. In some aspects, RRC configuration for each resource set may be per bandwidth part. In some aspects, the configuration and/or signaling may indicate one or more RRC-configured values of candidate available slots associated with transmission of SRS resources. In some aspects, the configuration and/or signaling may include a 1-bit indication in a scheduling DCI (Format 0_1, 1_1, 0_2, and/or 1_2) to select a valid uplink slot (or an SRS delay offset) for the triggered SRS information (e.g., A-SRS). In some aspects, when a bit field may be absent and/or disabled, an implicit value (e.g., first value), configured by RRC configuration, may be used to determine the available slot.

In some aspects, the MAC CE may update one or more of the RRC configured values. In some aspects, when the MAC CE updates an available slot (e.g., the MAC CE indicates a first available slot) for transmission of the A-SRS, and the DCI indicates a different available slot (e.g., a second available slot) for transmission of the A-SRS, the MS 320 may transmit the A-SRS according to the DCI indication of the different available slot based at least in part on determining that the time interval between the time of receipt of the MAC CE and the time of receipt of the DCI fails to satisfy the threshold offset interval. In some aspects, the DCI indication of the different available slot may be associated with a previous MAC CE indication of an available slot based at least in part on a previously received MAC CE. In some aspects, the DCI indication may be the same as the previous MAC CE indication when, for example, the DCI indication is consistent with the previous MAC CE indication (e.g., the DCI indication indicates a same available slot as the previous MAC CE indication).

In some aspects, when the MAC CE indicates an available slot for transmission of the A-SRS, and the DCI indicates a different available slot for transmission of the A-SRS, the MS 320 may transmit the A-SRS according to the MAC CE indication of the available slot based at least in part on determining that the time interval between the time of receipt of the MAC CE and the time of receipt of the DCI satisfies the threshold offset interval.

By performing the timeline-based transmission of SRS resources, as discussed herein, a UE may adequately determine whether a given SRS resource is to be considered as a currently activated SRS resource that should be transmitted to the BS in the A-SRS. In some aspects, the UE may determine whether a given SRS resource is to be considered as a currently activated SRS resource based at least in part on a time of receipt of a MAC CE. As a result, the UE may avoid erroneous transmissions and corrective retransmissions associated with transmitting the given SRS resource to the BS, thereby enabling efficient utilization of UE resources and network resources. A delay in the BS receiving error-free A-SRS and accurately estimating a measure of quality associated with an uplink channel utilized by the UE may also be avoided. Additionally, the UE may adequately determine a slot offset associated with transmission of the A-SRS. In this way, data communication between the UE and the BS may be improved.

As indicated above, FIGS. 3-7 are provided as examples. Other examples may differ from what is described with regard to FIGS. 3-7.

Figure 8:
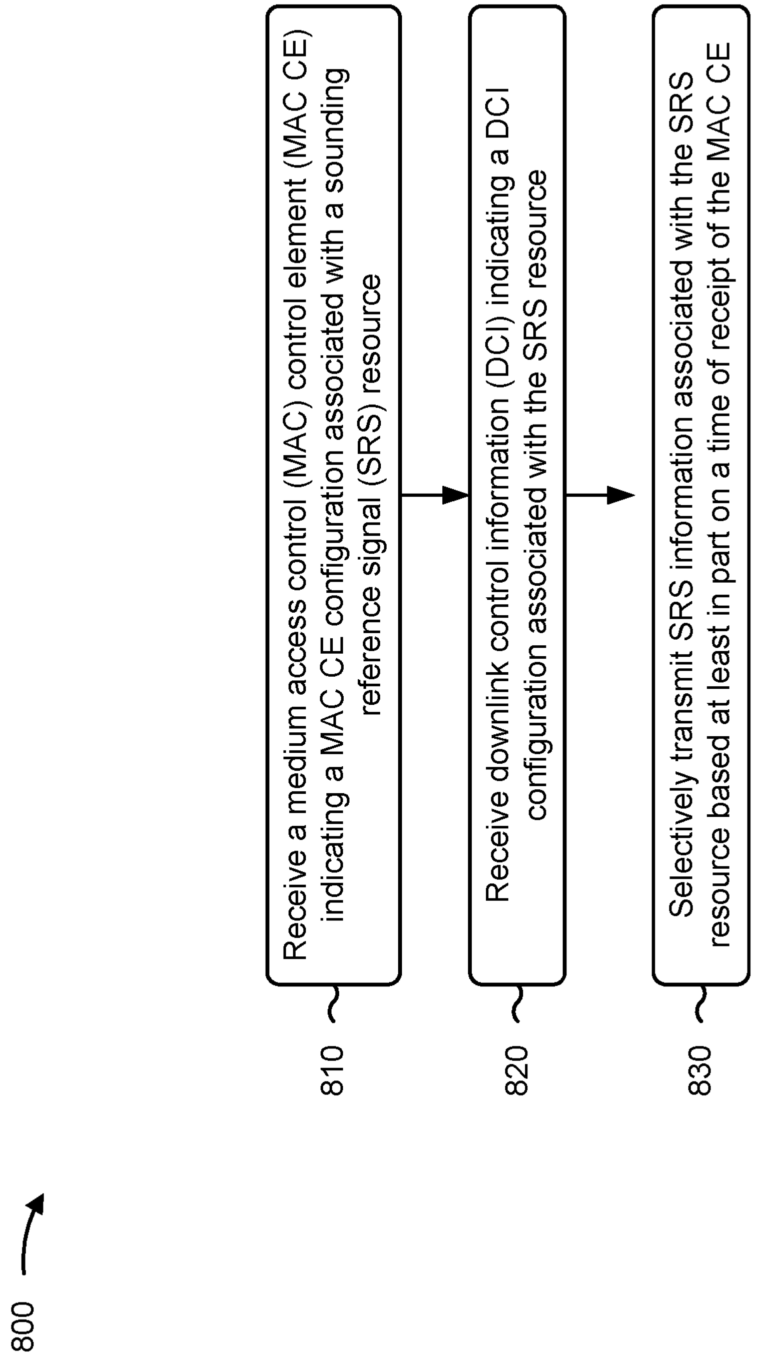
FIG. 8 is a diagram illustrating an example process associated with timeline-based transmission of SRS resources, in accordance with various aspects of the present disclosure.

FIG. 8 is a diagram illustrating an example process 800 performed, for example, by a mobile station (e.g., MS 320), in accordance with various aspects of the present disclosure. Example process 800 is an example where the mobile station performs operations associated with timeline-based transmission of sounding reference signal (SRS) resources.

As shown in FIG. 8, in some aspects, process 800 may include receiving a MAC CE indicating a MAC CE configuration associated with an SRS resource (block 810). For example, the mobile station (e.g., using reception component 902, depicted in FIG. 9) may receive a MAC CE indicating a MAC CE configuration associated with an SRS resource, as described above.

As further shown in FIG. 8, in some aspects, process 800 may include receiving DCI indicating a DCI configuration associated with the SRS resource (block 820). For example, the mobile station (e.g., using reception component 902, depicted in FIG. 9) may receive DCI indicating a DCI configuration associated with the SRS resource, as described above.

As further shown in FIG. 8, in some aspects, process 800 may include selectively transmitting SRS information associated with the SRS resource based at least in part on a time of receipt of the MAC CE (block 830). For example, the mobile station (e.g., using transmission component 904, depicted in FIG. 9) may selectively transmit SRS information associated with the SRS resource based at least in part on a time of receipt of the MAC CE, as described above.

Process 800 may include additional aspects, such as any single aspect or any combination of aspects described below and/or in connection with one or more other processes described elsewhere herein.

In a first aspect, selectively transmitting the SRS information comprises transmitting the SRS information according to the MAC CE configuration or according to the DCI configuration.

In a second aspect, alone or in combination with the first aspect, the DCI comprises an SRS request indicator (SRI) to indicate the DCI configuration.

In a third aspect, alone or in combination with one or more of the first and second aspects, the MAC CE configuration is associated with deactivating the SRS resource.

In a fourth aspect, alone or in combination with one or more of the first through third aspects, the DCI configuration is associated with activating the SRS resource.

In a fifth aspect, alone or in combination with one or more of the first through fourth aspects, the DCI configuration is associated with activating the SRS resource, previously deactivated by the MAC CE configuration.

In a sixth aspect, alone or in combination with one or more of the first through fifth aspects, process 800 includes determining, by the mobile station, that a time interval between the time of receipt of the MAC CE and a time of transmitting of the SRS information fails to satisfy a threshold time interval, wherein selectively transmitting the SRS information comprises transmitting the SRS information according to the DCI configuration based at least in part on the time interval failing to satisfy the threshold time interval.

In a seventh aspect, alone or in combination with one or more of the first through fifth aspects, process 800 includes determining, by the mobile station, that a time interval between the time of receipt of the MAC CE and a time of transmitting of the SRS information satisfies a threshold time interval, wherein selectively transmitting the SRS information comprises transmitting the SRS information according to the MAC CE configuration and without regard to the DCI configuration based at least in part on the time interval satisfying the threshold time interval.

In an eighth aspect, alone or in combination with one or more of the first through fifth aspects, process 800 includes determining, by the mobile station, that a time interval between the time of receipt of the MAC CE and a time of transmitting of the SRS information satisfies a threshold time interval, wherein selectively transmitting the SRS information comprises transmitting the SRS information according to the DCI configuration and without regard to the MAC CE configuration based at least in part on the time interval satisfying the threshold time interval.

In a ninth aspect, alone or in combination with one or more of the first through eighth aspects, the DCI configuration is associated with activating the SRS resource, subsequently deactivated by the MAC CE configuration.

In a tenth aspect, alone or in combination with one or more of the first through fifth aspects and the ninth aspect, process 800 includes determining, by the mobile station, that a time interval between the time of receipt of the MAC CE and a time of transmitting of the SRS information satisfies a threshold time interval, wherein selectively transmitting the SRS information comprises canceling transmitting the SRS information based at least in part on the time interval satisfying the threshold time interval.

In an eleventh aspect, alone or in combination with one or more of the first through fifth aspects and the eighth through tenth aspects, selectively transmitting the SRS information comprises transmitting the SRS information according to the DCI configuration when the time of receipt of the MAC CE is after a time of transmitting the SRS information.

In a twelfth aspect, alone or in combination with one or more of the first through fifth aspects and the eighth through eleventh aspects, selectively transmitting the SRS information comprises transmitting the SRS information according to the DCI configuration when the time of receipt of the MAC CE is after a time of receipt of the DCI.

In a thirteenth aspect, alone or in combination with one or more of the first through fifth aspects and the eighth through twelfth aspects, selectively transmitting the SRS information comprises transmitting the SRS information according to the DCI configuration and without regard to the MAC CE configuration when the time of receipt of the MAC CE is during a time of transmitting the SRS information.

In a fourteenth aspect, alone or in combination with one or more of the first through fifth aspects, selectively transmitting the SRS information comprises transmitting the SRS information according to a previous MAC CE configuration when the time of receipt of the MAC CE is during a time of transmitting the SRS information.

In a fifteenth aspect, alone or in combination with one or more of the first through fifth aspects, process 800 includes storing the MAC CE configuration to be applied to a later selective transmission when the time of receipt of the MAC CE is during a time of transmitting the SRS information.

In a sixteenth aspect, alone or in combination with one or more of the first through fifteenth aspects, process 800 includes that the MAC CE comprises a MAC CE slot offset associated with selectively transmitting the SRS information, the DCI comprises a DCI slot offset associated with selectively transmitting the SRS information, and selectively transmitting the SRS information comprises transmitting the SRS information according to the DCI slot offset based at least in part on a time interval between the time of receipt of the MAC CE and a time of receipt of the DCI fails to satisfy a threshold offset interval.

In a seventeenth aspect, alone or in combination with one or more of the first through sixteenth aspects, process 800 includes that the MAC CE comprises a MAC CE slot offset associated with selectively transmitting the SRS information, the DCI comprises a DCI slot offset associated with selectively transmitting the SRS information, and selectively transmitting the SRS information comprises transmitting the SRS information according to a previous MAC CE slot offset based at least in part on a time interval between the time of receipt of the MAC CE and a time of receipt of the DCI fails to satisfy a threshold offset interval.

In an eighteenth aspect, alone or in combination with one or more of the first through fifteenth aspects, process 800 includes that the MAC CE comprises a MAC CE slot offset associated with selectively transmitting the SRS information, the DCI comprises a DCI slot offset associated with selectively transmitting the SRS information, and selectively transmitting the SRS information comprises transmitting the SRS information according to the MAC CE slot offset based at least in part on a time interval between the time of receipt of the MAC CE and a time of receipt of the DCI satisfies a threshold offset interval.

In a nineteenth aspect, alone or in combination with one or more of the first through seventeenth aspects, process 800 includes that the MAC CE comprises a MAC CE indication of a first available slot associated with selectively transmitting the SRS information, the DCI comprises a DCI indication of a second available slot associated with selectively transmitting the SRS information, and selectively transmitting the SRS information comprises transmitting the SRS information according to the DCI indication of the second available slot based at least in part on a time interval between the time of receipt of the MAC CE and a time of receipt of the DCI failing to satisfy a threshold interval. In some aspects, the first and/or second available slots may be associated with a next available slot associated with transmission of the SRS information.

In a twentieth aspect, alone or in combination with one or more of the first through seventeenth aspects and the nineteenth aspect, process 800 includes that the MAC CE comprises a MAC CE indication of a first available slot associated with selectively transmitting the SRS information, the DCI comprises a DCI indication of a second available associated with selectively transmitting the SRS information, and selectively transmitting the SRS information comprises transmitting the SRS information according to a previous MAC CE indication of an available slot based at least in part on a time interval between the time of receipt of the MAC CE and a time of receipt of the DCI failing to satisfy a threshold interval. In some aspects, the first and/or second available slots may be associated with a next available slot associated with transmission of the SRS information.

In a twenty-first aspect, alone or in combination with one or more of the first through fifteenth aspects and the eighteenth aspect, process 800 includes that the MAC CE comprises a MAC CE indication of a first available slot associated with selectively transmitting the SRS information, the DCI comprises a DCI indication of a second available slot associated with selectively transmitting the SRS information, and selectively transmitting the SRS information comprises transmitting the SRS information according to the MAC CE indication of the first available slot based at least in part on a time interval between the time of receipt of the MAC CE and a time of receipt of the DCI satisfying a threshold interval. In some aspects, the first and/or second available slots may be associated with a next available slot associated with transmission of the SRS information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
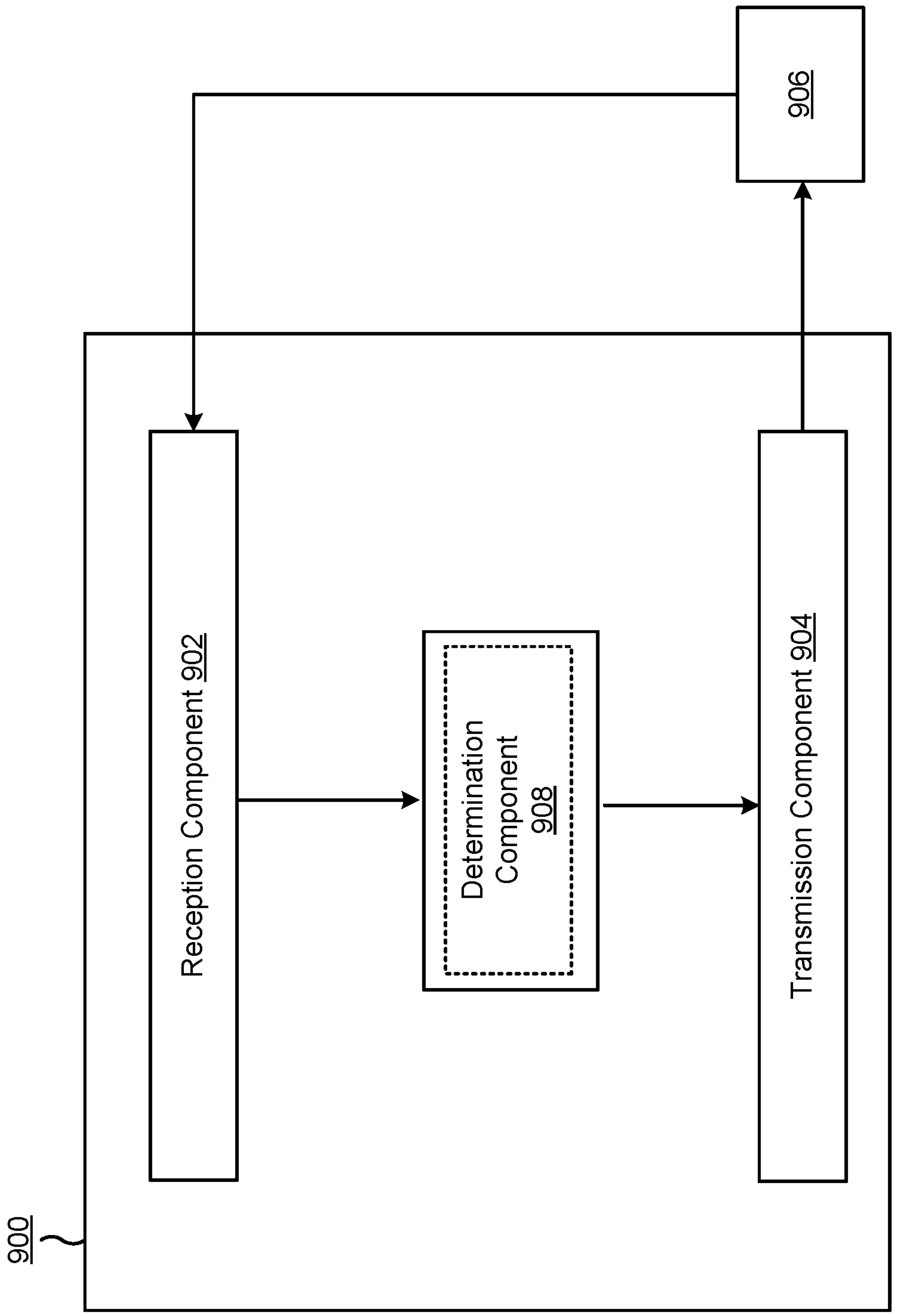
FIG. 9 is a diagram illustrating an example apparatus associated with timeline-based transmission of SRS resources, in accordance with various aspects of the present disclosure.

FIG. 9 is a block diagram of an example apparatus 900 associated with timeline-based transmission of SRS resources. The apparatus 900 may be a mobile station, or a mobile station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIGS. 3-7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the mobile station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the mobile station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the mobile station described above in connection with FIG. 2. In some aspects, the transmission component 904 may be co-located with the reception component 902 in a transceiver.

The reception component 902 may receive a medium access control (MAC) control element (MAC CE) indicating a MAC CE configuration associated with a sounding reference signal (SRS) resource. The reception component 902 may receive downlink control information (DCI) indicating a DCI configuration associated with the SRS resource. The transmission component 904 may selectively transmit SRS information associated with the SRS resource based at least in part on a time of receipt of the MAC CE.

The determination component 908 may determine that a time interval between the time of receipt of the MAC CE and a time of transmitting of the SRS information fails to satisfy a threshold time interval, wherein selectively transmitting the SRS information comprises transmitting the SRS information according to the DCI configuration based at least in part on the time interval failing to satisfy the threshold time interval.

The determination component 908 may determine that a time interval between the time of receipt of the MAC CE and a time of transmitting of the SRS information satisfies a threshold time interval, wherein selectively transmitting the SRS information comprises transmitting the SRS information according to the MAC CE configuration and without regard to the DCI configuration based at least in part on the time interval satisfying the threshold time interval.

The determination component 908 may determine that a time interval between the time of receipt of the MAC CE and a time of transmitting of the SRS information satisfies a threshold time interval, wherein selectively transmitting the SRS information comprises transmitting the SRS information according to the DCI configuration and without regard to the MAC CE configuration based at least in part on the time interval satisfying the threshold time interval.

The determination component 908 may determine that a time interval between the time of receipt of the MAC CE and a time of transmitting of the SRS information satisfies a threshold time interval, wherein selectively transmitting the SRS information comprises canceling transmitting the SRS information based at least in part on the time interval satisfying the threshold time interval.

The determination component 908 may store the MAC CE configuration to be applied to a later selective transmission when the time of receipt of the MAC CE is during a time of transmitting the SRS information.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a mobile station, comprising:

receiving, by the mobile station, a medium access control (MAC) control element (MAC CE) indicating a MAC CE configuration that includes first information to activate or deactivate a sounding reference signal (SRS) resource;

receiving, by the mobile station, downlink control information (DCI) indicating a DCI configuration that includes second information to activate or deactivate the SRS resource;

determining that the SRS resource is activated or deactivated based at least in part on:

a first time interval between a time of receipt of the MAC CE and the SRS resource, or a second time interval between the time of receipt of the MAC CE and a time of receipt of the DCI; and transmitting or canceling transmission of an SRS associated with the SRS resource in accordance with the determination.

2. The method of claim 1, wherein the method comprises transmitting the SRS according to the MAC CE configuration or according to the DCI configuration.

3. The method of claim 1, wherein the DCI comprises an SRS request indicator (SRI) to indicate the DCI configuration.

4. The method of claim 1, wherein the MAC CE configuration includes the first information to deactivate the SRS resource.

5. The method of claim 1, wherein the DCI configuration includes the second information to activate the SRS resource.

6. The method of claim 1, wherein the MAC CE configuration includes the first information to deactivate the SRS resource, and wherein the DCI configuration includes the second information to activate the SRS resource.

7. The method of claim 1, further comprising:

determining, by the mobile station, that the first time interval is less than a threshold time interval, wherein the method comprises transmitting the SRS according to the DCI configuration based at least in part on the first time interval being less than the threshold time interval.

8. The method of claim 1, further comprising:

determining, by the mobile station, that the first time interval satisfies a threshold time interval, wherein the method comprises transmitting the SRS according to the MAC CE configuration and without regard to the DCI configuration based at least in part on the first time interval satisfying the threshold time interval.

9. The method of claim 1, further comprising:

determining, by the mobile station, that the first time interval satisfies a threshold time interval, wherein the method comprises transmitting the SRS according to the DCI configuration and without regard to the MAC CE configuration based at least in part on the first time interval satisfying the threshold time interval.

10. The method of claim 1, wherein the DCI configuration includes the second information to activate the SRS resource, wherein the MAC CE configuration includes the first information to deactivate the SRS resource, and wherein the MAC CE is received after the DCI.

11. The method of claim 1, further comprising:

determining, by the mobile station, that the first time interval satisfies a threshold time interval, wherein the method comprises canceling transmission of the SRS based at least in part on the first time interval satisfying the threshold time interval.

12. The method of claim 1, wherein the method comprises transmitting the SRS according to the DCI configuration when the time of receipt of the MAC CE is after the SRS resource.

13. The method of claim 1, wherein the method comprises transmitting the SRS according to the DCI configuration when the time of receipt of the MAC CE is after the time of receipt of the DCI.

14. The method of claim 1, wherein the method comprises transmitting the SRS according to the DCI configuration and without regard to the MAC CE configuration when the time of receipt of the MAC CE is during a time span of the SRS resource.

15. The method of claim 1, wherein the method comprises transmitting the SRS according to a previous MAC CE configuration when the time of receipt of the MAC CE is during a time span of the SRS resource.

16. The method of claim 1, further comprising:

storing the MAC CE configuration to be applied to a later selective transmission when the time of receipt of the MAC CE is during a time span of the SRS resource.

17. The method of claim 1, wherein:

the MAC CE comprises a MAC CE slot offset corresponding to transmission of the SRS, the DCI comprises a DCI slot offset corresponding to transmission of the SRS, and the method comprises transmitting the SRS according to the DCI slot offset based at least in part on the second time interval being less than a threshold offset interval.

18. The method of claim 1, wherein:

the MAC CE comprises a MAC CE slot offset corresponding to transmission of the SRS, the DCI comprises a DCI slot offset corresponding to transmission of the SRS, and the method comprises transmitting the SRS according to a previous MAC CE slot offset based at least in part on the second time interval being less than a threshold offset interval.

19. The method of claim 1, wherein:

the MAC CE comprises a MAC CE slot offset corresponding to transmission of the SRS, the DCI comprises a DCI slot offset corresponding to transmission of the SRS, and the method comprises transmitting the SRS according to the MAC CE slot offset based at least in part on the second time interval satisfying a threshold offset interval.

20. The method of claim 1, wherein:

the MAC CE comprises a MAC CE indication of a first available slot corresponding to transmission of the SRS, the DCI comprises a DCI indication of a second available slot corresponding to transmission of the SRS, and the method comprises transmitting the SRS according to the DCI indication of the second available slot based at least in part on the second time interval failing to satisfy a threshold offset interval.

21. The method of claim 1, wherein;

the MAC CE comprises a MAC CE indication of a first available slot corresponding to transmission of the SRS, the DCI comprises a DCI indication of a second available corresponding to transmission of the SRS, and the method comprises transmitting the SRS according to a previous MAC CE indication of an available slot based at least in part on the second time interval being less than a threshold offset interval.

22. The method of claim 1, wherein:

the MAC CE comprises a MAC CE indication of a first available slot corresponding to transmission of the SRS, the DCI comprises a DCI indication of a second available slot corresponding to transmission of the SRS, and the method comprises transmitting the SRS according to the MAC CE indication of the first available slot based at least in part on the second time interval satisfying a threshold offset interval.

23. A mobile station for wireless communication, comprising:

a memory; and one or more processors coupled to the memory, the one or more processors configured to:

receive a medium access control (MAC) control element (MAC CE) indicating a MAC CE configuration that includes first information to activate or deactivate a sounding reference signal (SRS) resource;

receive downlink control information (DCI) indicating a DCI configuration that includes second information to activate or deactivate the SRS resource;

determine that the SRS resource is activated or deactivated based at least in part on:

a first time interval between a time of receipt of the MAC CE and the SRS resource, or a second time interval between the time of receipt of the MAC CE and a time of receipt of the DCI; and transmit or cancel transmission of an SRS associated with the SRS resource in accordance with the determination.

24. The mobile station of claim 23, wherein the one or more processors are configured to transmit the SRS according to the MAC CE configuration or according to the DCI configuration.

25. The mobile station of claim 23, wherein the DCI comprises an SRS request indicator (SRI) to indicate the DCI configuration.

26. The mobile station of claim 23, wherein the MAC CE configuration includes the first information to deactivate the SRS resource.

27. The mobile station of claim 23, wherein the DCI configuration includes the second information to activate the SRS resource.

28. The mobile station of claim 23, wherein the MAC CE configuration includes the first information to deactivate the SRS resource, and wherein the DCI configuration includes the second information to activate the SRS resource.

29. The mobile station of claim 23, wherein the one or more processors are configured to:

determine that the first time interval is less than a threshold time interval, wherein the one or more processors are configured to transmit the SRS according to the DCI configuration based at least in part on the first time interval being less than the threshold time interval.

30. The mobile station of claim 23, wherein the one or more processors are configured to:

determine that the first time interval satisfies a threshold time interval, wherein the one or more processors are configured to transmit the SRS according to the MAC CE configuration and without regard to the DCI configuration based at least in part on the first time interval satisfying the threshold time interval.

31. The mobile station of claim 23, wherein the one or more processors are configured to:

determine that the first time interval satisfies a threshold time interval, wherein the one or more processors are configured to transmit the SRS according to the DCI configuration and without regard to the MAC CE configuration based at least in part on the first time interval satisfying the threshold time interval.

32. The mobile station of claim 23, wherein the DCI configuration includes the second information to activate the SRS resource, wherein the MAC CE configuration includes the first information to deactivate the SRS resource, and wherein the MAC CE is received after the DCI.

33. The mobile station of claim 23, wherein the one or more processors are configured to:

determine that the first time interval satisfies a threshold time interval, wherein the one or more processors are configured to cancel transmission of the SRS based at least in part on the first time interval satisfying the threshold time interval.

34. The mobile station of claim 23, wherein the one or more processors are configured to transmit the SRS according to the DCI configuration when the time of receipt of the MAC CE is after the SRS resource.

35. The mobile station of claim 23, wherein the one or more processors are configured to transmit the SRS according to the DCI configuration when the time of receipt of the MAC CE is after the time of receipt of the DCI.

36. The mobile station of claim 23, wherein the one or more processors are configured to transmit the SRS according to the DCI configuration and without regard to the MAC CE configuration when the time of receipt of the MAC CE is during a time span of the SRS resource.

37. The mobile station of claim 23, wherein the one or more processors are configured to transmit the SRS according to a previous MAC CE configuration when the time of receipt of the MAC CE is during a time span of the SRS resource.

38. The mobile station of claim 23, wherein the one or more processors are configured to:

store the MAC CE configuration to be applied to a later selective transmission when the time of receipt of the MAC CE is during a time span of the SRS resource.

39. The mobile station of claim 23, wherein:

the MAC CE comprises a MAC CE slot offset corresponding to transmission of the SRS, the DCI comprises a DCI slot offset corresponding to transmission of the SRS, and the one or more processors are configured to transmit the SRS according to the DCI slot offset based at least in part on the second time interval being less than a threshold offset interval.

40. The mobile station of claim 23, wherein:

the MAC CE comprises a MAC CE slot offset corresponding to transmission of the SRS, the DCI comprises a DCI slot offset corresponding to transmission of the SRS, and the one or more processors are configured to transmit the SRS according to a previous MAC CE slot offset based at least in part on the second time interval being less than a threshold offset interval.

41. The mobile station of claim 23, wherein:

the MAC CE comprises a MAC CE slot offset corresponding to transmission of the SRS, the DCI comprises a DCI slot offset corresponding to transmission of the SRS, and the one or more processors are configured to transmit the SRS according to the MAC CE slot offset based at least in part on the second time interval satisfying a threshold offset interval.

42. The mobile station of claim 23, wherein:

the MAC CE comprises a MAC CE indication of a first available slot corresponding to transmission of the SRS, the DCI comprises a DCI indication of a second available slot corresponding to transmission of the SRS, and the one or more processors are configured to transmit the SRS according to the DCI indication of the second available slot based at least in part on the second time interval being less than a threshold offset interval.

43. The mobile station of claim 23, wherein:

the MAC CE comprises a MAC CE indication of a first available slot corresponding to transmission of the SRS, the DCI comprises a DCI indication of a second available corresponding to transmission of the SRS, and the one or more processors are configured to transmit the SRS according to a previous MAC CE indication of an available slot based at least in part on the second time interval being less than a threshold offset interval.

44. The mobile station of claim 23, wherein:

the MAC CE comprises a MAC CE indication of a first available slot corresponding to transmission of the SRS, the DCI comprises a DCI indication of a second available slot corresponding to transmission of the SRS, and the one or more processors are configured to transmit the SRS according to the MAC CE indication of the first available slot based at least in part on the second time interval satisfying a threshold offset interval.

* * * * *